United States Patent
Lee et al.

(10) Patent No.: US 11,167,658 B2
(45) Date of Patent: Nov. 9, 2021

(54) APPARATUS, SYSTEM, AND METHOD FOR CONTROLLING CHARGING FOR ELECTRIC VEHICLE

(71) Applicants: HYUNDAI MOTOR COMPANY, Seoul (KR); KIA MOTORS CORPORATION, Seoul (KR)

(72) Inventors: Don Hyoung Lee, Anyang-si (KR); Chung Hi Lee, Seoul (KR); Hyeon Soo Kim, Suwon-si (KR); Tae Sun Roh, Seoul (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 247 days.

(21) Appl. No.: 16/418,870

(22) Filed: May 21, 2019

(65) Prior Publication Data
US 2020/0156497 A1 May 21, 2020

(30) Foreign Application Priority Data
Nov. 16, 2018 (KR) .................. 10-2018-0142020

(51) Int. Cl.
| B60L 53/66 | (2019.01) |
| B60L 53/16 | (2019.01) |
| H04L 9/32 | (2006.01) |
| H04L 9/30 | (2006.01) |

(52) U.S. Cl.
CPC ............. *B60L 53/66* (2019.02); *B60L 53/16* (2019.02); *H04L 9/30* (2013.01); *H04L 9/3268* (2013.01)

(58) Field of Classification Search
CPC . B60L 53/66; B60L 53/16; H04L 9/30; H04L 9/3268
USPC ....................................................... 320/109
See application file for complete search history.

(56) References Cited

U.S. PATENT DOCUMENTS

| 10,949,843 B2 * | 3/2021 | Mouftah .............. G06Q 20/388 |
| 2009/0261779 A1 * | 10/2009 | Zyren ................... H02J 7/0042 320/109 |
| 2009/0278492 A1 * | 11/2009 | Shimizu ............... B60L 53/126 320/108 |
| 2013/0015809 A1 * | 1/2013 | Frey ....................... B60L 53/67 320/106 |
| 2017/0136894 A1 * | 5/2017 | Ricci ...................... B60L 50/53 |
| 2018/0336551 A1 * | 11/2018 | Mouftah ............... G06Q 20/18 |
| 2018/0337957 A1 * | 11/2018 | Chen ..................... H04L 63/205 |
| 2019/0054836 A1 * | 2/2019 | Haneda ................. B60L 55/00 |

(Continued)

*Primary Examiner* — Suresh Memula
(74) *Attorney, Agent, or Firm* — Morgan, Lewis & Bockius LLP

(57) ABSTRACT

An electric vehicle charging control system may include an electric vehicle which extracts current time information, the integrity of which has been verified, by use of a public key cryptography, and charges power from a charging terminal, when it is determined that a charging contact certificate is valid, based on the extracted current time information, a server to transmit the current time information, the integrity of which has been verified using the public key cryptography, to the electric vehicle, and the charging terminal connected to the electric vehicle. The validity of the certificate used in vehicle charging and billing for charging is determined through the power line communication, and the security against the hacking is enhanced in the charging of the electric vehicle.

18 Claims, 4 Drawing Sheets

(56) References Cited

U.S. PATENT DOCUMENTS

2020/0130643 A1\* 4/2020 Bode .................... B60L 53/305
2020/0139840 A1\* 5/2020 Roeder .................. H04W 4/40

\* cited by examiner

APPARATUS, SYSTEM, AND METHOD FOR CONTROLLING CHARGING FOR ELECTRIC VEHICLE

CROSS-REFERENCE TO RELATED APPLICATION

The present application claims priority to Korean Patent Application No. 10-2018-0142020, filed on Nov. 16, 2018, the entire contents of which is incorporated herein for all purposes by this reference.

BACKGROUND OF THE INVENTION

Field of the Invention

The present invention relates to an apparatus, a system, and a method for controlling charging for an electric vehicle.

Description of Related Art

Recently, a manner for charging an electric vehicle has been suggested in which customer authentication, charging, and billing are simultaneously performed through power line communication (PLC). According to a power line-based manner, charging and communication are performed through a charging cable instead of separately installing wired and wireless devices, when the electric vehicle is charged. Furthermore, a vehicle is authenticated based on a certificate received by a driver from an authentication organization (charging company) and billing for power charging is automatically performed.

To the present end, the vehicle needs a certificate which is valid, and accurate time information has to be ensured to determine whether the certificate is valid.

However, currently, it is difficult to set a criterion on determining current time. Although the current time may be determined by making a vehicle and a portable terminal internetworking with each other, it is difficult to ensure time information in a shadow area.

Furthermore, although current time is determined by applying a real time clock (RTC), material costs may be increased as additional hardware is applied.

If there is absent accurate time information, it is difficult to determine whether the validity period of the certificate disposed for automatic billing is expired or whether a certificate legally released is currently used.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus, a system, and a method for controlling charging for an electric vehicle, configured for determining the validity of the certificate, which is used in power charging for a vehicle and billing for the power charging, through power line communication, by acquiring time information, the integrity of which is ensured.

Various aspects of the present invention are directed to providing an apparatus, a system, and a method for controlling charging for an electric vehicle, configured for enhancing security against hacking in charging for the electric vehicle.

The technical problems to be solved by the present inventive concept are not limited to the aforementioned problems, and any other technical problems not mentioned herein will be clearly understood from the following description by those skilled in the art to which the present invention pertains.

According to various aspects of the present invention, a system for controlling charging for an electric vehicle, may include an electric vehicle charging control apparatus, wherein the electric vehicle charging control apparatus is configured to transmit a time information request message, which is encrypted by use of a public key to server, to extract current time information by decrypting a time information response message, which is received from the server and encrypted, to determine validity of a certificate based on the extracted current time information, and to control a charging operation based on a result of the determination, and the server, wherein the server is configured to decrypt the time information request message, which is received from the electric vehicle charging control apparatus, by use of a private key, and to transmit the time information response message, including the current time information, which is encrypted by use of the private key, to the electric vehicle charging control apparatus.

Furthermore, the system may further include a charging terminal to charge power, when the validity of the certificate is determined.

Furthermore, the electric vehicle charging control apparatus makes power line communication with the charging terminal.

Furthermore, the electric vehicle charging control apparatus decrypts the time information response message by use of the public key.

The electric vehicle charging control apparatus controls charging of power in an external identification means (EIM) manner, when it is determined that the time information response message fails to be decrypted by use of the public key.

Furthermore, the electric vehicle charging control apparatus performs protocol encryption when the current time information is extracted.

Furthermore, the system performs a control operation to terminate charging of power, when the certificate is invalid based on the extracted time information.

Furthermore, the system performs a control operation to charge power in a Plug and Charge (PnC) manner, when it is determined that the certificate is valid, based on the extracted time information.

According to various aspects of the present invention, an electric vehicle charging control apparatus may include a communication device, wherein the communication device is configured to transmit a time information request message, which is encrypted by use of a public key to a server, and to receive a time information response message, which is encrypted, from the server, and a controller, wherein the controller is configured to extract current time information by decrypting the time information response message, which is encrypted by use of the pubic key, to determine validity of a certificate based on the extracted current time information, and to control a charging operation based on a result of the determination.

According to various aspects of the present invention, a method for controlling charging for an electric vehicle may include encrypting a time information request message by use of a public key to transmit an encryption result to a server, receiving a time information response message, which is encrypted, from the server, decrypting the received time information response message to extract current time information, determining validity of a certificate based on the extracted current time information, and controlling a charging operation based on a result of the determination.

Furthermore, the receiving of the time information response message, which is encrypted, from the server may include receiving the encrypted time information request message, by the server, decrypting the encrypted time information request message by use of a private key, by the server, generating the time information response message by the server, encrypting the time information response message using the private key, by the server, and transmitting the encrypted time information response message to an electric vehicle charging control apparatus, by the server.

Furthermore, the received time information response message is decrypted by use of the public key.

Furthermore, charging is controlled in an external identification means (EIM) manner, when it is determined that the time information response message fails to be decrypted by use of the public key.

Furthermore, the method may further include performing protocol encryption when the current time information is extracted.

Furthermore, charging is controlled to be terminated when the validity of the certificate is not determined.

Furthermore, charging is controlled in a Plug and Charge (PnC) manner when the validity of the certificate is determined.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
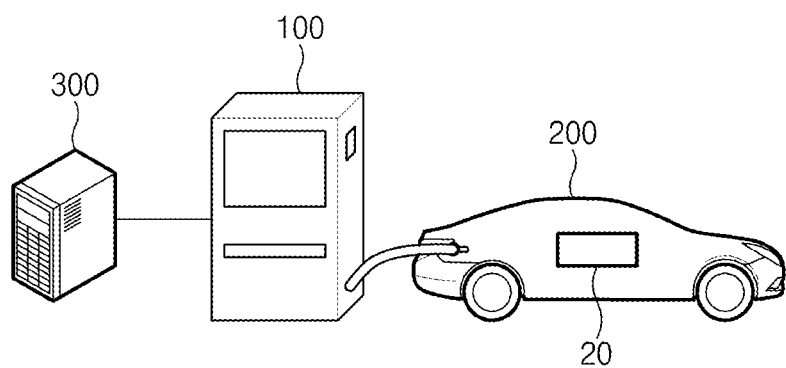
FIG. 1 is a block diagram illustrating an electric vehicle charging control system, according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, embodiments of the present invention will be described in detail with reference to accompanying drawings. In the following description, the same reference numerals will be assigned to the same components even though the components are illustrated in different drawings. Furthermore, in the following description of an exemplary embodiment of the present invention, the detailed description of well-known features or functions will be ruled out in order not to unnecessarily obscure the gist of the present invention.

In describing components of exemplary embodiments of the present invention, the terms $1^{st}$, $2^{nd}$ first, second, A, B, (a), (b), and the like may be used herein. These terms are only used to distinguish one component from another component, but do not limit the corresponding components irrespective of the order or priority of the corresponding components. Unless otherwise defined, all terms used herein, including technical or scientific terms, have the same meanings as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a system (hereinafter, referred to as "electric vehicle charging control system") for controlling charging for an electric vehicle, according to an exemplary embodiment of the present invention.

As illustrated in FIG. 1, according to an exemplary embodiment of the present invention, an electric vehicle charging control system may include a charging terminal 100, an apparatus 20 (hereinafter, referred to as "electric vehicle charging control apparatus") for controlling charging an electric vehicle, which is provided in an electric vehicle 200, and a vehicle original equipment manufacturer (OEM) server 300.

The charging terminal 100 may make power line communication with the electric vehicle 200 and may make power line communication with the vehicle OEM server 300.

The charging terminal 100 may supply electric power to the electric vehicle 200.

The charging terminal 100 may determine an amount (charging amount) of power charged to the electric vehicle 200 based on a certificate (the certificate for the charging contact made between the vehicle and a charging company) provided to the electric vehicle charging control apparatus 20 and may perform automatic billing for the electric vehicle 200.

The charging terminal 100 does not charge the electric vehicle 200 with power, when the electric vehicle charging control apparatus 20 fails to correctly determine the validity period of the certificate to determine the validity period of the certificate as being expired even if the validity period of the certificate is not expired, or to determine the validity period as not being expired even though the validity period of the certificate has been expired.

In other words, when the electric vehicle charging control apparatus 20 correctly determines the validity period of the certificate, the charging terminal 100 may charge the electric vehicle 200 with power, based on the validity period of the certificate.

The electric vehicle charging control apparatus 20 may receive the certificate and a public key from the vehicle OEM server 300 at a vehicle production stage, and the certificate may be used to verify the integrity of the vehicle when a contract for automatic billing is set at an initial charging stage.

Furthermore, the electric vehicle charging control apparatus 20 may receive, from the vehicle OEM server 300, current time information, the integrity of which has been verified, by use of the public key cryptography.

When receiving the current time information, the integrity of which has been verified, from the vehicle OEM server 300, the electric vehicle charging control apparatus 20 may determine the validity of the certificate based on the current time information, the integrity of which has been verified. When the certificate is determined as being valid, the electric vehicle charging control apparatus 20 may transmit the determination result to the charging terminal 100 and the power charging company to control charging such that the charging starts.

The vehicle OEM server 300 may transmit the certificate and the public key to the electric vehicle charging control apparatus 20 at the vehicle production stage.

The vehicle OEM server 300 may transmit the current time information, the integrity of which has been verified, by use of the public key cryptography.

In more detail, when receiving a time information request message, which is encrypted, from the electric vehicle charging control apparatus 20, the vehicle OEM server 300 may decrypt the received time information request message by use of a private key. In the instant case, the time information request message may include content for requesting for the time information.

When decrypting the time information request message, which is received from the electric vehicle charging control apparatus 20, by use of the private key, the vehicle OEM server 300 may determine the integrity of the message received from the electric vehicle charging control apparatus 20.

When failing to decrypt the message received from the electric vehicle charging control apparatus 20 by use of the private key, the vehicle OEM server 300 may determine the message, which is received from the electric vehicle charging control apparatus 20, as forged information.

When determining the message, which is received from the electric vehicle charging control apparatus 20, as having integrity, the vehicle OEM server 300 may encrypt the current time information by use of the private key and may transmit the encryption result to the electric vehicle charging control apparatus 20.

Figure 2:
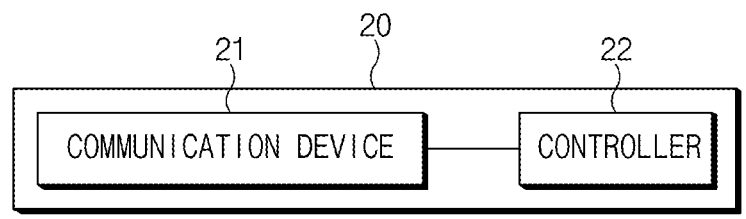
FIG. 2 is a block diagram illustrating the electric vehicle charging control apparatus, according to an exemplary embodiment of the present invention.

FIG. 2 is a block diagram illustrating the electric vehicle charging control apparatus, according to an exemplary embodiment of the present invention.

As illustrated in FIG. 2, according to an exemplary embodiment of the present invention, the electric vehicle 200 may include a communication device 21 and a controller 22.

The communication device 21 may make communication with the charging terminal 100 and the vehicle OEM server 300.

The communication device 21 may make power line communication with the charging terminal 100 and may make communication with the vehicle OEM server 300 through the charging terminal 100. In the instant case, power line communication (PLC) refers to communication for transmitting and receiving voice and data through a power line for supplying electric power.

The communication device 21 may make wireless communication with the vehicle OEM server 300. The communication device 21 may make wireless communication with the vehicle OEM server 300 and, according to an exemplary embodiment of the present invention, may make wireless communication through Wireless Broadband, World Interoperability for Microwave Access (Wimax), Bluetooth, Radio Frequency Identification (RFID), Infrared Data Association (IrDA), Ultra Wide Band (UWB), and ZigBee.

The communication device 21 may receive the public key and the certificate from the vehicle OEM server 300 at the vehicle production stage.

The communication device 21 may make IP-based communication when a session for power line communication is established with the charging terminal 100.

The communication device 21 may transmit the encrypted time information request message to the vehicle OEM server 300 to determine the validity period of the certificate of the electric vehicle, before charging the charging terminal 100.

The communication device 21 may receive a time information response message, which is encrypted, from the vehicle OEM server 300. In the instant case, the encrypted time information response message includes current time information.

The communication device 21 may transmit information on the charging amount to the charging terminal 100 and may receive billing information for power charging from the charging terminal 100 when the power charging is performed.

The controller 22 may control the overall operation of the electric vehicle 200, according to an exemplary embodiment of the present invention.

The controller 22 may determine the validity period of the certificate based on the current time information, the integrity of which has been verified, in the public key cryptography.

In more detail, the controller 22 may encrypt the time information request message, which is used for request for time information from the vehicle OEM server 300, by use of the public key received from the vehicle OEM server 300.

Since the controller 22 utilizes the public key received from the vehicle OEM server 300 when encrypting the message, the controller 22 may verify the integrity of a message transmitted from the electric charging control apparatus 20.

The controller 22 may perform a control operation to transmit the time information request message for requesting for time information, which is encrypted by use of the public key, to the vehicle OEM server 300. The decryption and encryption of the message transmitted to the vehicle OEM server 300 may be performed in the following manner.

The vehicle OEM server 300 may decrypt the encrypted time information request message, which is received from the electric vehicle charging control apparatus 20, by use of the private key of the vehicle OEM server 3000, as described with reference to FIG. 1. When the encrypted time information request message is decrypted, the vehicle OEM server 300 may determine that the content of the message received from the electric vehicle charging control apparatus 20 is the content for requesting for the time information.

The vehicle OEM server 300 generates the time information response message including time information, which is requested by the electric vehicle charging control apparatus 20, and encrypts the time information response message by use of the private key. By encrypting the time information response message using the private key, the vehicle OEM server 300 may verify the integrity of the time information response message and the encryption fact in the vehicle OEM server 300 is not denied later.

When the vehicle OEM server 300 transmits the time information response message which is encrypted by use of the private key, the controller 22 performs a control operation to receive the encrypted time information response message from the vehicle OEM server 300.

The controller 22 may decrypt (release the encryption) the encrypted time information response message, which is received from the vehicle OEM server 300, by use of the public key.

Since the controller 22 decrypts the encrypted time information response message from the vehicle OEM server 300 by use of the public key, the controller 22 may determine that the encrypted time information response message is received from a trusted server without being falsified (integrity), and may extract the accurate current time information from the encrypted time information response message.

However, when the encrypted time information response message fails to be decrypted by use of the public key, the controller 22 may determine that the encrypted time information response message is received from a server, the integrity of which is not verified. In the instant case, the controller 22 may progress the charging of power in an external identification means (EIM) manner.

The EIM manner, which is to charge power through a user interface provided in the charging terminal 100, allows a user to personally handle an interface, such as a touch screen, to charge power and to directly pay for the determined charging amount.

The controller 22 performs protocol encryption when the current time information, the integrity of which has been verified, is extracted. The controller 22 may perform the protocol encryption to prevent eavesdropping, interference, and falsification during the communication process between the communication device 21 and the vehicle OEM server 300. The protocol encryption may be performed in a Transport Layer Security (TLS) manner.

The controller 22 may extract information on the validity period of the certificate.

The controller 22 may determine whether the certificate is valid, based on the current time information, the integrity of which has been verified.

When the controller 22 determines that the certificate has been expired and thus is not valid any more, the controller 22 may perform a control operation to terminate the charging of power.

The controller 22 may perform a control operation to perform the charging in a Plug and Charge (PnC) manner when the controller 22 determines that the certificate is valid.

The PnC manner refers to a manner in which a user interface is not separately provided in the charging terminal 100, power is automatically charged through the communication between the charging terminal 100 and the electric vehicle charging control apparatus 20, and billing is automatically made depending on the charging amount.

As described above, according to an exemplary embodiment of the present invention, the electric vehicle extracts the current time information by transmitting and receiving a message, the integrity of which has been verified using the public key received from the vehicle OEM server 300, obtaining time information having integrity ensured even under an environment, such as a Global Positioning System (GPS) shadow area, in which it is difficult to obtain accurate time information.

Furthermore, the electric vehicle and the vehicle OEM server 300 may transmit and receive a message by employing public key cryptography, verifying the integrities of the electric vehicle and the server, as well as the integrity of the message. Accordingly, time may be prevented from being falsified due to hacking.

Figure 3:
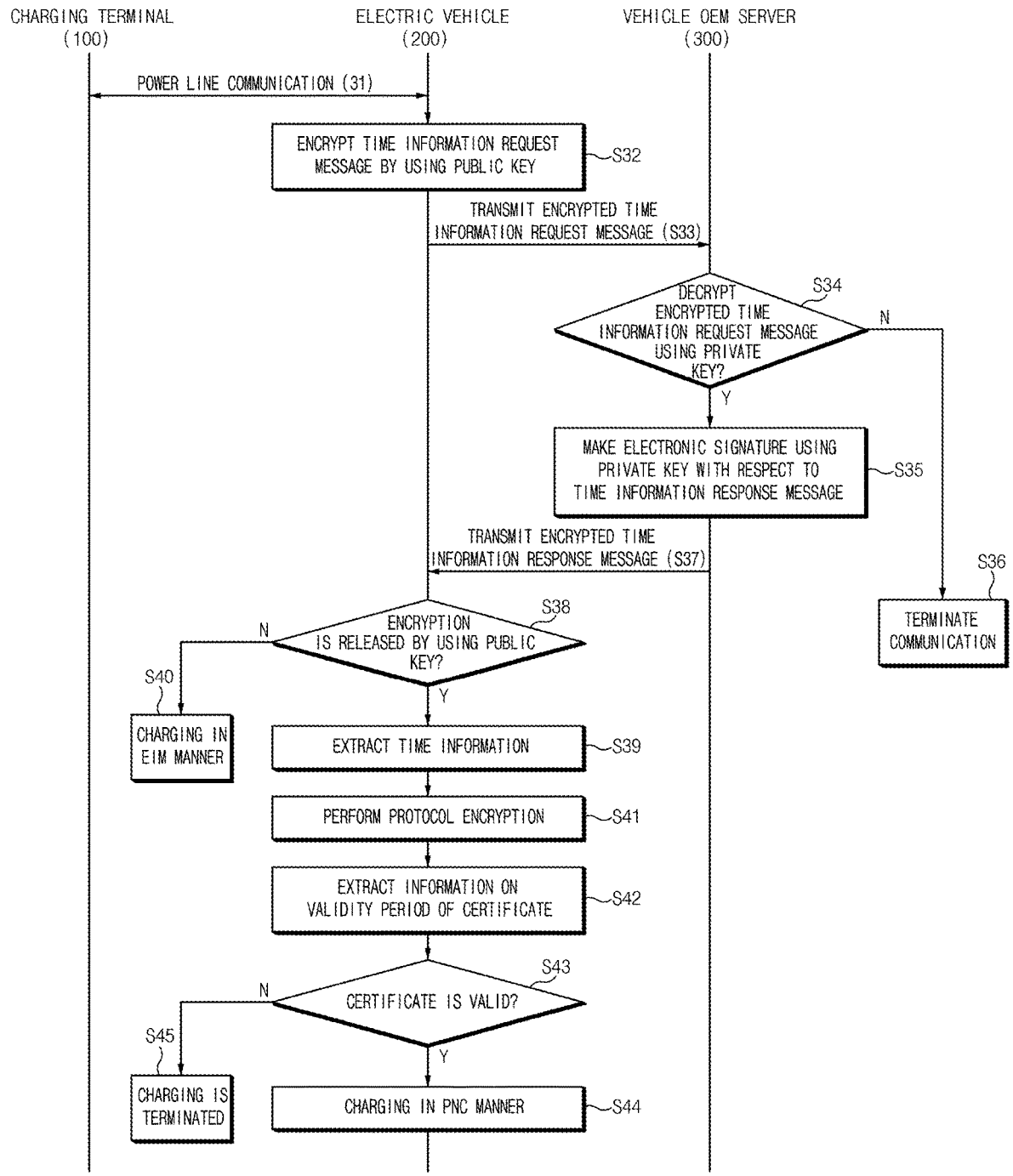
FIG. 3 is a flowchart illustrating a method for controlling charging for the electric vehicle, according to an exemplary embodiment of the present invention.

FIG. 3 is a flowchart illustrating a method for controlling charging for the electric vehicle, according to an exemplary embodiment of the present invention.

As illustrated in FIG. 3, the charging terminal 100 and the electric vehicle charging control apparatus 20 are connected to each other (S31). In operation S31, the charging terminal 100 and the electric vehicle charging control apparatus 20 may make power line communication.

The electric vehicle charging control apparatus 20 encrypts the time information request message by use of the public key (S32). In operation S32, since the electric vehicle charging control apparatus 20 may use the public key received from the vehicle OEM server 300 when encrypting the message, the integrity of the message transmitted from the electric vehicle charging control apparatus 20 may be verified.

In the electric vehicle charging control apparatus 20, the controller 22 transmits the time information request message, which is encrypted by use of the public key, to the vehicle OEM server 300 (S33).

When receiving the encrypted time information request message from the electric vehicle charging control apparatus 20, the vehicle OEM server 300 determines whether the encrypted message is decrypted (released from the encryption) using the private key of the vehicle OEM server (S34).

When the time information request message received from the electric vehicle charging control apparatus 20 is decrypted (Y) by use of the private key, the vehicle OEM server 300 determines that the content in the message received from the electric vehicle charging control apparatus 20 is content for requesting time information, generates a time information response message including current time information, and encrypts the time information response message by use of the private key (S35). In operation S35, the vehicle OEM server 300 may verify the integrity of the time information response message by encrypting the time information response message using the private key, and the encryption fact is not denied later.

The vehicle OEM server 300 terminates the communication of the electric vehicle charging control apparatus 20 (S36), when determining that the message received from the electric vehicle charging control apparatus 20 is not been decrypted using the private key (N).

The vehicle OEM server 300 transmits the time information response message, which encrypted by use of the private key, to the electric vehicle charging control apparatus 20 using the private key (S37).

When receiving the encrypted time information response message from the vehicle OEM server 300, the electric vehicle charging control apparatus 20 determines whether the encryption of the time information response message is possible by use of the public key (S38).

When it is determined, in operation S38, that the electric vehicle charging control apparatus 20 may decrypt the time information response message by use of the public key (Y), the electric vehicle charging control apparatus 20 may determine that the time information response message is received from a trusted server without being falsified (integrity). Subsequently, the electric vehicle charging control apparatus 20 extracts the accurate current time information from the decrypted time information response message (S39).

When it is not determined, in step S38, that the electric vehicle charging control apparatus 20 may decrypt the time information response message by use of the public key (N), the electric vehicle charging control apparatus 20 may determine that the time information response message is received from a server, the integrity of which is not verified, and may progress the charging in the EIM manner.

When extracting the current time information in operation S39, the electric vehicle charging control apparatus 20 performs protocol encryption (S41). In operation S41, the protocol encryption may be performed to prevent eavesdropping, interference, and falsification during the communication process between the electric vehicle charging control apparatus 20 and the vehicle OEM server 300. According to various aspects of the present invention, the exemplary embodiment of the present invention, the protocol encryption may be performed in the TLS manner.

The electric vehicle charging control apparatus 20 extracts the information on the validity period of the certificate (S42).

The electric vehicle charging control apparatus 20 compares the current time information, the integrity of which has been verified, with the validity period of the certificate to determine the validity of the certificate (S43).

When the validity of the certificate is verified, the controller 22 performs a control operation to perform charging in the PnC manner (S44).

The PnC manner refers to a manner in which a user interface is not separately provided in the charging terminal 100, power is automatically charged through the communication between the charging terminal 100 and the electric vehicle charging control apparatus 20, and billing is automatically made depending on the charging amount.

When it is determined that the certificate has expired and is invalid, the controller 22 performs a control operation to terminate the charging (S45).

Figure 4:
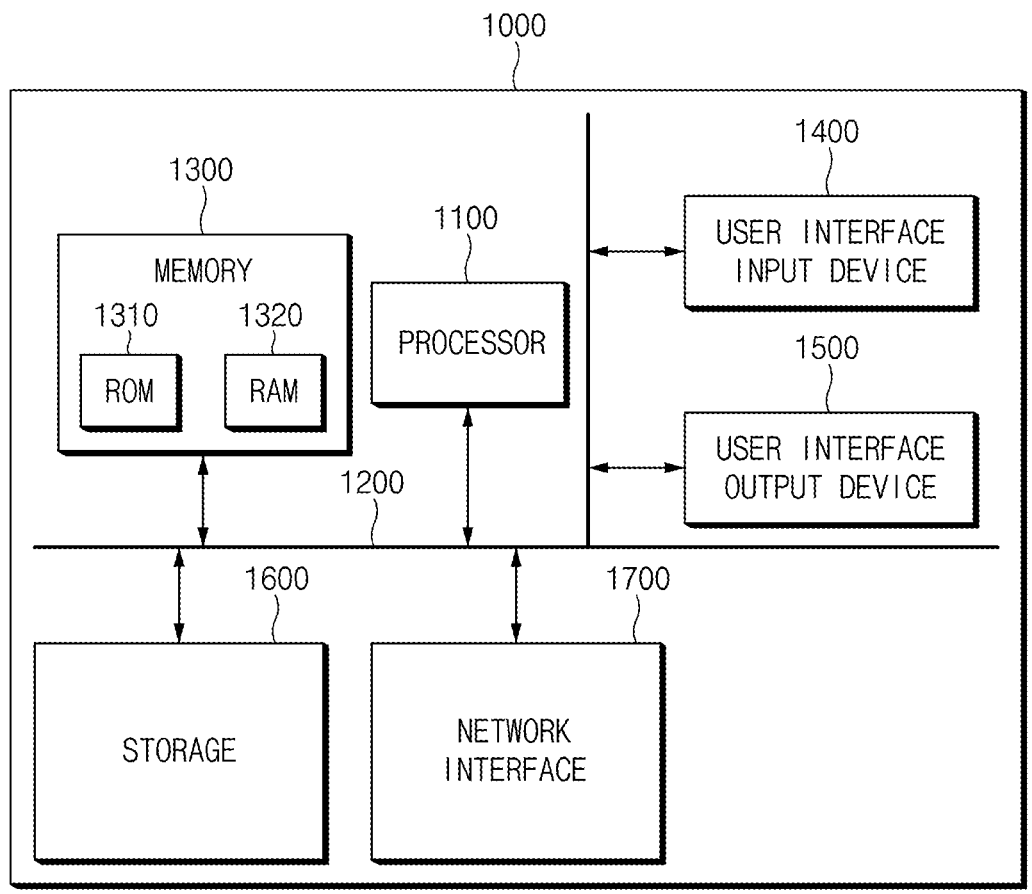
FIG. 4 illustrates a computing system to execute the method, according to an exemplary embodiment of the present invention.

FIG. 4 illustrates a computing system, according to an exemplary embodiment of the present invention.

Referring to FIG. 4, the apparatus according to an exemplary embodiment of the present invention may be implemented through a computing system. A computing system 1000 may include at least one processor 1100, a memory 13000, a user interface input device 1400, a user interface output device 1500, a storage 1600, and a network interface 1700, which are connected to each other via a bus 1200.

The processor 1100 may be a central processing unit (CPU) or a semiconductor device configured for processing instructions stored in the memory 13000 and/or the storage 1600. Each of the memory 13000 and the storage 1600 may include various types of volatile or non-volatile storage media. For example, the memory 13000 may include a read only memory (ROM) and a random access memory (RAM).

Thus, the operations of the methods or algorithms described in connection with the exemplary embodiments included in the specification may be directly implemented with a hardware module, a software module, or combinations thereof, executed by the processor 1100. The software module may reside on a storage medium (e.g., the memory 13000 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). A. An exemplary storage medium may be coupled to the processor 1100. The processor 1100 may read out information from the storage medium and may write information in the storage medium. A. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component of the user terminal.

As described above, according to an exemplary embodiment of the present invention, in the apparatus, the system, and the method for controlling charging for an electric vehicle, the validity of the certificate, which is used in power charging for the vehicle and billing for the power charging, may be exactly determined through power line communication, by acquiring time information, the integrity of which is ensured. Security against hacking may be ensured in the charging for the electric vehicle.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for controlling charging for an electric vehicle, the system comprising:
   an electric vehicle charging control apparatus provided in the electric vehicle, wherein the electric vehicle charging control apparatus is configured to:
   transmit a time information request message to a server, wherein the transmitted time information request message is encrypted by use of a public key;
   extract current time information by decrypting an encrypted time information response message, wherein the encrypted time information response message is received from the server;

determine validity of a certificate based on the extracted current time information; and control a charging operation based on a result of the determination, and the server, wherein the server is configured to:

decrypt the encrypted time information request message by use of a private key, wherein the encrypted time information request message is received from the electric vehicle charging control apparatus; and transmit a time information response message, including the current time information, to the electric vehicle charging control apparatus, wherein the transmitted time information response message is encrypted by use of the private key.

2. The system of claim 1, further including:
a charging terminal to charge power to the electric vehicle, when the validity of the certificate is determined.

3. The system of claim 2, wherein the electric vehicle charging control apparatus of the electric vehicle makes power line communication with the charging terminal.

4. The system of claim 1, wherein the electric vehicle charging control apparatus decrypts the encrypted time information response message by use of the public key.

5. The system of claim 1, wherein the electric vehicle charging control apparatus controls charging of power in an external identification means (EIM) manner, when it is determined, by the electric vehicle charging control apparatus, that the encrypted time information response message fails to be decrypted by use of the public key.

6. The system of claim 1, wherein the electric vehicle charging control apparatus performs protocol encryption when the current time information is extracted.

7. The system of claim 1, wherein the system performs a control operation to terminate charging of power, when the certificate is invalid based on the extracted current time information.

8. The system of claim 1, wherein the system performs a control operation to charge power, when it is determined, by the electric vehicle charging control apparatus, that the certificate is valid, based on the extracted current time information.

9. An electric vehicle charging control apparatus comprising:
a communication device, wherein the communication device is configured to:
transmit a time information request message to a server, wherein the transmitted time information request message is encrypted by use of a public key and
receive an encrypted time information response message from the server, and
a controller connected to the communication device, wherein the controller is configured to:
extract current time information by decrypting the encrypted time information response message, wherein the encrypted time information response message is decrypted by use of the public key;
determine validity of a certificate based on the extracted current time information; and
control a charging operation based on a result of the determination.

10. A method for controlling charging for an electric vehicle, the method comprising:
encrypting, by an electric vehicle charging control apparatus, a time information request message by use of a public key to transmit an encryption result to a server;
receiving, by the electric vehicle charging control apparatus from the server, an encrypted time information response message;
decrypting, by the electric vehicle charging control apparatus, the encrypted time information response message to extract current time information;
determining, by the electric vehicle charging control apparatus, validity of a certificate based on the extracted current time information; and
controlling, by the electric vehicle charging control apparatus, a charging operation based on a result of the determination.

11. The method of claim 10, wherein the receiving of the encrypted time information response message, from the server includes:
receiving the encrypted time information request message, by the server;
decrypting the encrypted time information request message by use of a private key, by the server;
generating a time information response message by the server;
encrypting the time information response message using the private key, by the server; and
transmitting the encrypted time information response message to the electric vehicle charging control apparatus, by the server.

12. The method of claim 10, wherein the encrypted time information response message is decrypted by use of the public key.

13. The method of claim 12, wherein the charging is controlled in an external identification means (EIM) manner, when it is determined, by the electric vehicle charging control apparatus, that the encrypted time information response message fails to be decrypted by use of the public key.

14. The method of claim 10, further including:
performing, by the electric vehicle charging control apparatus, protocol encryption when the current time information is extracted.

15. The method of claim 10, wherein the charging is controlled to be terminated when the validity of the certificate is not determined.

16. The method of claim 10, wherein the charging is controlled when the validity of the certificate is determined.

17. The method of claim 10, further including:
when the validity of the certificate is determined, charging power to the electric vehicle by a charging terminal.

18. The method of claim 17, wherein the electric vehicle charging control apparatus of the electric vehicle makes power line communication with the charging terminal.

* * * * *